United States Patent [19]
Skoglund et al.

[11] Patent Number: 6,013,695
[45] Date of Patent: Jan. 11, 2000

[54] FOUNDRY BINDERS CONTAINING MODIFIED POLYISOCYANATES

[75] Inventors: Michael Jeffrey Skoglund, Dublin; Jeffery Dale Ungerer, Columbus, both of Ohio

[73] Assignee: Ashland Inc., Covington, Ky.

[21] Appl. No.: 09/163,589

[22] Filed: Sep. 30, 1998

[51] Int. Cl.⁷ ........................................ B22C 1/22
[52] U.S. Cl. ............................. 523/143; 523/142
[58] Field of Search ................... 523/143, 142

[56] References Cited

U.S. PATENT DOCUMENTS

| | | | |
|---|---|---|---|
| 3,645,942 | 2/1972 | Brown et al. | 523/142 |
| 3,905,934 | 9/1975 | Brown et al. | 525/297 |
| 4,079,031 | 3/1978 | Sardessai et al. | 260/37 |
| 4,148,777 | 4/1979 | LaBar et al. | 260/37 |
| 4,268,425 | 5/1981 | Gardikes | 523/143 |
| 4,311,631 | 1/1982 | Myers et al. | 260/38 |
| 4,507,408 | 3/1985 | Torbus et al. | 523/143 |
| 4,602,069 | 7/1986 | Dunnavant et al. | 525/504 |
| 4,683,252 | 7/1987 | Dunnavant et al. | 523/143 |
| 4,729,925 | 3/1988 | Chen et al. | 428/425.8 |
| 4,760,101 | 7/1988 | Fechter et al. | 523/143 |
| 5,132,339 | 7/1992 | Carpenter et al. | 523/143 |
| 5,874,487 | 2/1999 | Sing et al. | 523/143 |

OTHER PUBLICATIONS

Castor Oil, Kirk–Othmer Encyclopedia of Chemical Technology, Fourth Edition, John Wiley & Sons, 1993, vol. 5, pp. 301–320.

*Primary Examiner*—David W. Wu
*Assistant Examiner*—Ling Sui Choi
*Attorney, Agent, or Firm*—David L. Hedden

[57] ABSTRACT

The invention relates to foundry binder systems which contain modified polyisocyanates. The modified polyisocyanates are prepared by reacting a polyisocyanate with a triglyceride of ricinoleic acid. These modified polyisocyanates a phenolic resole resin are mixed with a foundry aggregate to form a foundry mix which is shaped and cured with an amine curing catalyst.

17 Claims, 1 Drawing Sheet

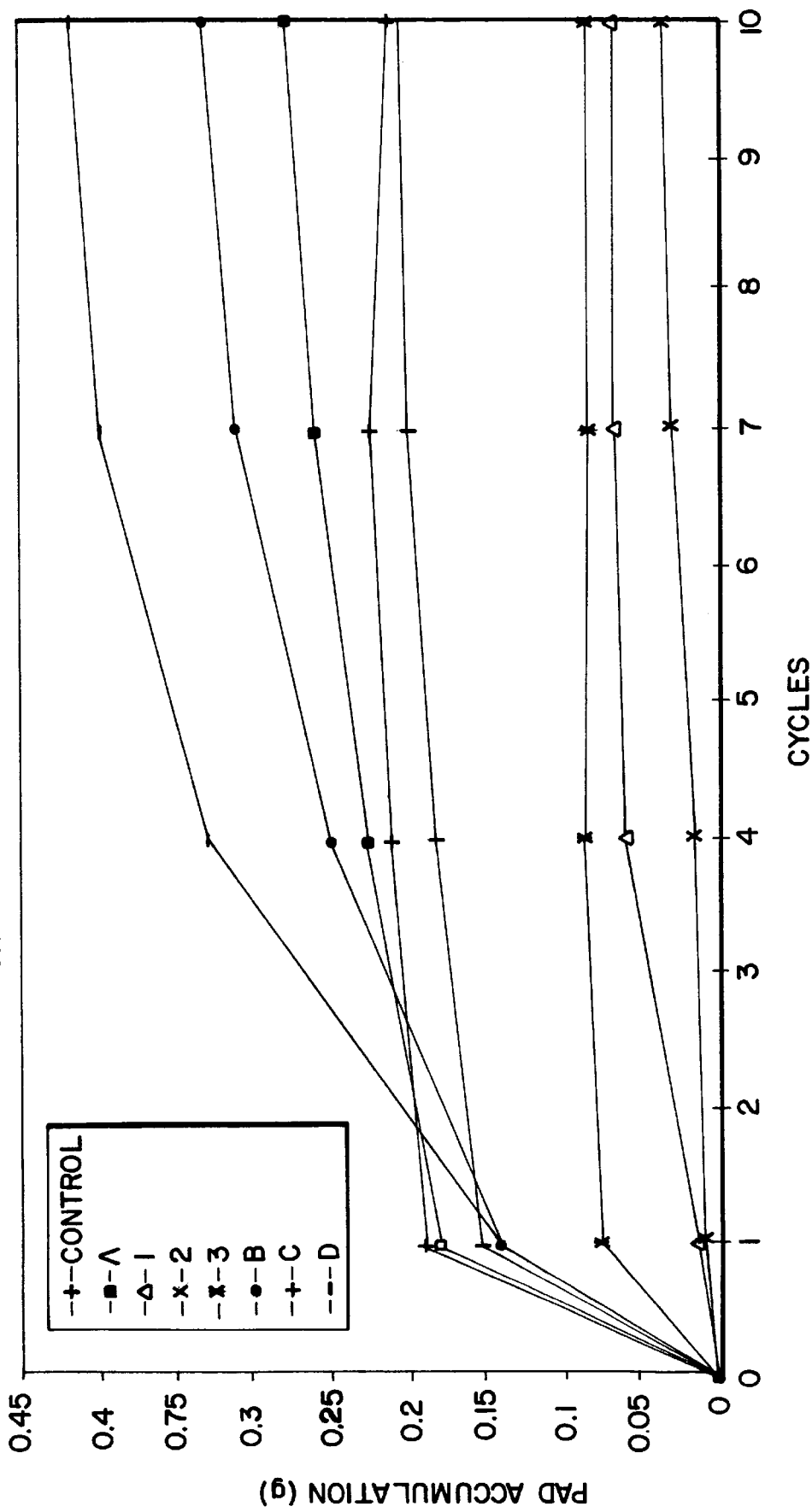
Fig. I

FOUNDRY BINDERS CONTAINING MODIFIED POLYISOCYANATES

FIELD OF THE INVENTION

The invention relates to foundry binder systems which contain modified polyisocyanates. The modified polyisocyanates are prepared by reacting a polyisocyanate with a triglyceride of ricinoleic acid. The modified polyisocyanate and a phenolic resole resin are mixed with a foundry aggregate to form a foundry mix which is shaped and cured with an amine curing catalyst.

BACKGROUND OF THE INVENTION

One of the major processes used in the foundry industry for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

Two of the major processes used in sand casting for making molds and cores are the no-bake process and the cold-box process. In the no-bake process, a liquid curing agent is mixed with an aggregate and shaped to produce a cured mold and/or core. In the cold-box process, a gaseous curing agent is passed through a compacted shaped mix to produce a cured mold and/or core. Polyurethane-forming binders, cured with a gaseous tertiary amine catalyst, are often used in the cold-box process to hold shaped foundry aggregate together as a mold or core. See for example U.S. Pat. No. 3,409,579. The polyurethane-forming binder system usually consists of a phenolic resin component and polyisocyanate component which are mixed with sand prior to compacting and curing to form a foundry mix.

Among other things, the binder must have a low viscosity, be gel-free, remain stable under use conditions, and cure efficiently. The foundry mix made by mixing sand with the binder must have adequate benchlife or the mix will not shape and cure properly. The cores and molds made with the binders must have adequate tensile strengths under normal and humid conditions, and release effectively from the pattern. Binders which meet all of these requirements are not easy to develop.

Certain modified polyisocyanates are known in the prior art. For instance U.S. Pat. No. 4,396,738 discloses modified polyisocyanates prepared by the partial reaction of some of the isocyanate groups of the polyisocyanate with a monohydroxy alcohol having the formula ROH, where R is a hydrocarbon containing six to thirty carbon atoms. These modified polyisocyanates are combined with vinyl lattices and used in aqueous coatings and adhesives.

U.S. Pat. No. 3,645,942 discloses prepolymers prepared by reacting a polyisocyanate with castor oil such that the ratio of OH groups to NCO groups is from 67:100 to 12:100. These prepolymers are mixed with a second mixture comprising 2,4-bis [N,N-di-2-(2-hydroxypropoxy) propyl] amino-1-methyl benzene and certain accelerators. The mixture is used for preparing foundry cores.

U.S. Pat. No. 4,507,408 vaguely alludes to the use of prepolymers of multivalent alcohols with polyisocyanates for use in the preparation of foundry binders.

DESCRIPTION OF THE DRAWING

FIG. 1 is a graphical representation of the pad sticking data of Table V. It shows the accumulation of sand aggregate on the core box pad as the number of coremaking cycles increase, and compares the accumulation on the corebox tooling where the binders are made from unmodified polyisocyanates (outside the scope of the invention) to the pad accumulation where the cores are made with modified polyisocyanates (within the scope of the invention).

SUMMARY OF THE INVENTION

This invention relates to polyurethane-forming foundry binder systems curable with a catalytically effective amount of an amine curing catalyst comprising as separate components:

(A) a phenolic resin component; and (B) a polyisocyanate component comprising a polyisocyanate modified with a triglyceride of ricinoleic acid. Particularly preferred as the source of the triglyceride of ricinoleic acid is castor oil. Derivatives of castor oil can also be used as a source of ricinoleic acid.

The foundry binder systems are particularly useful for making foundry mixes used in the no-bake and preferably cold-box fabrication processes for making foundry shapes. Foundry mixes are prepared by mixing component A and B with an aggregate. The foundry mixes are preferably used to make molds and cores by the cold-box process which involves curing the molds and cores with a gaseous tertiary amine. The cured molds and cores are used to cast ferrous and non ferrous metal parts.

The modified polyisocyanate reacts with the phenolic resin in the presence of an gaseous tertiary amine curing catalyst. The isocyanate (NCO) content of the polyisocyanate decreases when the polyisocyanate is reacted with a triglyceride of ricinoleic acid. The amount of decrease depends upon the amount of modification, but there is still sufficient free isocyanate in the modified polyisocyanate to react with the hydroxyl groups of the phenolic resin in the phenolic resin component.

The use of the modified polyisocyanates in the binder results in improved release of the cores and molds from the patterns and an increase in bulk cure for the binder without sacrificing binder strength. The modified polyisocyanate has a usefully low viscosity, is gel-free, and remains stable.

DETAILED DESCRIPTION OF THE INVENTION INCLUDING THE BEST MODE

For purposes of describing this invention, "polyisocyanate" includes "diisocyanate", and "polyisocyanates suitable for modification" includes any polyisocyanate. The polyisocyanate component of the binder system contains at least one modified polyisocyanate, and has a functionality of two or more, preferably 2 to 5. A modified polyisocyanate is a polyisocyanate which is reacted with a triglyceride of ricinoleic acid such that some of the NCO groups of the polyisocyanate form urethane linkages.

The modified polyisocyanates typically have a free NCO content from 1 to 50 weight percent, preferably from 12 to 33 weight percent. Particular polyisocyanates which are suitable for modification with alcohols include aromatic polyisocyanates, aliphatic and/or cycloaliphatic polyisocyanates, and mixtures thereof. Representative aromatic polyisocyanates include m-phenylene diisocyanate, 2,4-toluene diisocyanate, 2,6-toluene diisocyanate, mixtures of 2,4-and 2,6-toluene diisocyanate, naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyl-diphenylmethane-4,4'-diisocyanate; the triisocyanates such as 4,4', 4"-triphenylmethane triisocyanate, and toluene 2,4,6-triisocyanate; and the tetraisocyanates such as 4,4'-dimethyldiphenylmethane-2,2',5,5'-tetraisocyanate. Especially useful due to their availability and properties are 4,4'-diphenylmethane diisocyanate, and polymeric polyisocyanates such as polymethylene polyphenylene polyisocyanate.

Representative aliphatic polyisocyanates which are suitable for modification include hexamethylene diisocyanate, tetramethylene diisocyanate, cyclohexane-1,4-diisocyanate, hexahydrotoluene diisocyanate (and isomers), isophorone diisocyanate, and cyclic polyisocyanates such as 4,4'-dicyclohexylmethane diisocyanate. Also suitable are various prepolymers, and trimers based on these polyisocyanates, be they aromatic or aliphatic.

Representative of mixed polyisocyanates include for example mixtures of aromatic polyisocyanates with other aromatic polyisocyanates or aliphatic polyisocyanates, or for example mixed trimers of aromatic and aliphatic polyisocyanates.

Because of economical considerations, the source of the triglyceride of ricinoleic acid is preferably castor oil, a trihydric alcohol. Castor oil, also known as ricinus oil, oil of Palma Christi, tangantangan oil, neoloid, is comprised mostly of a triglyceride of ricinoleic acid, $C_{18}H_{34}O_3$, (cis-12-hydroxyoctadeca-9-enoic acid). This triglyceride of ricinoleic acid can be represented by the following formula:

$ROCH_2CH(OR)CH_2OR$ where
$R=CH_3(CH_2)_5CH(OH)CH_2CH=CH(CH_2)_7C=O$

Castor oil also contains minor amounts of other fatty acid triglycerides. A typical composition of castor oil is given in Table 1.

TABLE 1

FATTY ACIDS FORMING TRIGLYCERCIDES
FOUND IN A TYPICAL CASTOR OIL[1] COMPOSITION

| Fatty Acid | Molecular Formula | Weight % |
| --- | --- | --- |
| Ricinoleic | $C_{18}H_{34}O_3$ | 89.5 |
| Dihydroxystearic | $C_{18}H_{36}O_4$ | 0.7 |
| Palmitic | $C_{16}H_{32}O_2$ | 1.0 |
| Stearic | $C_{18}H_{36}O_2$ | 1.0 |
| Oleic | $C_{18}H_{34}O_2$ | 3.0 |
| Linoleic | $C_{18}H_{32}O_2$ | 4.2 |
| Linolenic | $C_{18}H_{30}O_2$ | 0.3 |
| Eicosanoic | $C_{20}H_{40}O_2$ | 0.3 |

[1]Castor Oil, in Kirk-Othmer Encyclopedia of Chemical Technology, Fourth Ed., John Wiley & Son Inc., (1993).

For purposes of defining this invention, "castor oil" shall be construed to mean derivatives of castor oil which are triglycerides of a $C_{18}$ and other higher fatty acids prepared by modifying castor oil, and derivatives of ricinoleic acid prepared by modifying ricinoleic acid. Examples of such derivatives are discussed in Castor Oil, *Kirk-Othmer Encyclopedia of Chemical Technology*, Fourth Ed., John Wiley & Son Inc., pages 301–320 (1993) which is hereby incorporated by reference into this specification. Of particular interest are castor oil derivatives are: (1) acylated castor oil which is a derivative of castor oil prepared by partially acylating castor oil with an acid chloride, such as palmitoyl chloride ($C_{16}$), thus forming a hydroxy functional triglyceride with $C_{18}$ and $C_{34}$ fatty acid substituents; (2) derivatives of castor oil prepared by partially esterifying the castor oil with an organic acid to form a hydroxy functional triglyceride with $C_{18}$ and other fatty acids; (3) castor oil polyols which are derivatives of castor oil prepared by the oxyalkylation of castor oil; (4) castor oil partially transesterified with acids, other than ricinoleic acid, which forms hydroxy functional triglycerides of mixed acids; (5) hydrogenated castor oil which results in a triglyceride of 12-hydroxystearic acid; (6) castor oil derivatives formed by partially dehydrating the castor oil to form a hydroxy functional triglyceride; (7) sulfonated castor oil known as a turkey-red oil derivative; and (8) halogenated castor oil derivatives.

The modified polyisocyanates are typically prepared by adding the modifier, i.e. castor oil, to unmodified polyisocyanate in a reaction vessel equipped with a condenser at room temperature under a nitrogen blanket. The mixture is stirred and the reaction vessel is heated to 60° C. to 110° C. where it is maintained at this temperature for about 90 to 120 minutes. The modified polyisocyanates can also be prepared in-situ by adding the triglyceride of ricinoleic acid to the polyisocyanate component of the binder. The ratio of OH groups of the triglyceride of ricinoleic acid to the NCO groups of the polyisocyanate is generally from about 0.1:100 to about 7.3:100, preferably about 0.8:100 to about 3.3:100.

The modified polyisocyanates can be diluted with unmodified polyisocyanates including aliphatic, cycloaliphatic, aromatic, hybrid polyisocyanates, quasi-prepolymers, and prepolymers as mentioned before such as those used to prepare the modified polyisocyanates. The unmodified polyisocyanates used for making or diluting the modified polyisocyanates typically have an NCO content of 2 weight percent to 50 weight percent, preferably from 15 to 35 weight percent. If the modified polyisocyanate is diluted with a polyisocyanate, the polyisocyanate component typically contains from 5 weight percent to 50 weight percent of unmodified polyisocyanate upon the total weight of the polyisocyanate in the polyisocyanate component.

The polyisocyanates are used in sufficient concentrations in the binder to cause the curing of the phenolic resin with an amine curing catalyst. In general the ratio of NCO groups of the polyisocyanate to the OH groups of the phenolic resin is from 0.75:1.25 to 1.25:0.75, preferably about 0.9:1.1 to 1.1:0.9. The polyisocyanate is used in a liquid form. Solid or viscous polyisocyanates must be used in the form of organic solvent solutions, the solvent generally being present in a range of up to 80 percent by weight of the solution.

The phenolic resole resin component comprises a phenolic resole resin and preferably a solvent. It may also contain various optional ingredients such as adhesion promoters and release agents.

The phenolic resin used must be liquid or organic solvent-soluble. The phenolic resin component of the binder composition is generally employed as a solution in an organic solvent. The amount of solvent used should be sufficient to result in a binder composition permitting uniform coating thereof on the aggregate and uniform reaction of the mixture. The specific solvent concentration for the phenolic resins will vary depending on the type of phenolic resins employed and its molecular weight. In general, the solvent concentration will be in the range of up to 80% by weight of the resin solution, preferably in the range of 20% to 80%.

The phenolic resole resin is preferably prepared by reacting an excess of aldehyde with a phenol in the presence of either an alkaline catalyst or a metal catalyst. The phenolic resins are preferably substantially free of water and are organic solvent soluble. The preferred phenolic resins used in the subject binder compositions are well known in the art, and are specifically described in U.S. Pat. No. 3,485,797 which is hereby incorporated by reference. These resins, known as benzylic ether phenolic resole resins are the reaction products of an aldehyde with a phenol. They contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium.

The phenols use to prepare the phenolic resole resins include any one or more of the phenols which have heretofore been employed in the formation of phenolic resins and which are not substituted at either the two ortho-positions or at one ortho-position and the para-position. Such unsubstituted positions are necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3, 4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable.

The aldehyde used to react with the phenol has the formula RCHO wherein R is a hydrogen or hydrocarbon radical of 1 to 8 carbon atoms. The aldehydes reacted with the phenol can include any of the aldehydes heretofore employed in the forrnation of phenolic resins such as formaldehyde, acetaldehyde, propionaldehyde, furfuraldehyde, and benzaldehyde. In general, the aldehydes employed have the formula RCHO wherein R is a hydrogen or a hydrocarbon radical of 1 to 8 carbon atoms. The most preferred aldehyde is formaldehyde.

Silanes may also be incorporated into the phenolic resin component. Useful silanes have the following general formula:

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The silane is preferably added to the phenolic resin component in amounts of 0.01 to 2 weight percent, preferably 0.1 to 0.5 weight percent based on the weight of the phenolic resin component. Examples of some commercially available silanes are Dow Corning Z6040 and (Witco sells the Silquest silanes now) A-187 (gamma glycidoxy propyltrimethoxy silane); Silquest A-1100 (gamma aminopropyltriethoxy silane); Silquest A-1120 (N-beta (aminoethyl)-gamma-amino-propyltrimethoxy silane); and Silquest A-1160 (Ureido-silane). Those skilled in the art will know how to select specific solvents for the phenolic resin component and polyisocyanate hardener component. It is known that the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanate. Aromatic solvents, although compatible with the polyisocyanate, are less compatible with the phenolic results. It is, therefore, preferred to employ combinations of solvents and particularly combinations of aromatic and polar solvents.

Examples of aromatic solvents include xylene and ethylbenzene. The aromatic solvents are preferably a mixture of aromatic solvents that have a boiling point range of 125° C. to 250° C. The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and "Texanol". Cellosolve, Carbitol, and Texanol are all trade names.

In addition, the solvent component can include drying oils such as disclosed in U.S. Pat. No. 4,268,425. Such drying oils include glycerides of fatty acids which contain two or more double bonds whereby oxygen on exposure to air can be absorbed to give peroxides which catalyze the polymerization of the unsaturated portions. Also, esters of ethylenically unsaturated fatty acids such as tall oil esters of polyhydric alcohols such as glycerine or pentaerythritol or monohydric alcohols such as methyl and ethyl alcohols can be employed as the drying oil.

In addition, the binder may include liquid dialkyl esters such as dialkyl phthalate of the type disclosed in U.S. Pat. No. 3,905,934. Other dialkyl esters include dimethyl glutarate such as available from Du Pont under the trade designation DBE-5; dimethyl adipate, available from Du Pont under the trade designation DBE-5; dimethyl succinate; and mixtures of such esters which are available from Du Pont under the trade designation DBE, and dialkyl adipates and succinates with alcohols up to 12 carbon atoms.

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes," as used herein, refers to foundry shapes which have sufficient porosity to permit escape of volatiles from it during the casting operation.

The preferred aggregate employed for ordinary foundry shapes is silica wherein at least about 70 weight percent and preferably at least about 85 weight percent of the sand is silica. Other suitable aggregate materials include zircon, olivine, aluminosilicate, sand, chromite sand, and the like. Although the aggregate employed is preferably dry, it can contain minor amounts of moisture.

In molding compositions, the aggregate constitutes the major constituent and the binder constitutes a relatively minor amount. In ordinary sand type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand-type foundry shapes.

The binder compositions are preferably made available as a two-package system with the phenolic resin component in one package and the isocyanate component in the other package. Usually, the phenolic resin component the binder compositon of the is first mixed with the sand. The polyisocyanate component is mixed with the sand. Methods of distributing the binder on the aggregate particles are well-known to those skilled in the art. The molding mix is molded into the desired shape and cured. Unless otherwise stated, the foundry mixes in the examples are cured by the cold-box process by passing a tertiary amine through the molded mix as described in U.S. Pat. No. 3,409,579.

DEFINITIONS AND ABBREVIATIONS

AHS=aromatic hydrocarbon solvent.
ALS=aliphatic hydrocarbon solvent.
BLE=benchlife extender.
BLEND=a blend of castor oil in the phenolic resin component where the amount of castor oil is 5.8 weight percent based upon the weight of the phenolic resin component.
CASTOR OIL=No. 1 grade castor oil having a free fatty acid value of 1.0% maximum, a hydroxyl value of 160–168, a moisture content of 0.25, and a volatile content of 0.355 weight percent.
MDI=unmodified polyethylene polyphenyl isocyanate having a free NCO content of 32, a functionality of 2.4, and a viscosity of 73 cps at 25° C.
MMDI-1=modified MDI prepared by reacting 4 weight percent castor oil with MDI where MMDI-1 has an NCO content of 30 weight percent and a viscosity of 139 cps at 25° C.
MMDI-2=modified MDI prepared by reacting 5 weight percent castor oil with MDI where MMDI-1 has an NCO content of 29 weight percent and a viscosity of 153 cps at 25° C.
MMDI-3=modified polyisocyanate prepared by reacting 5 weight percent of a castor oil derivative[2] to form a modified polyisocyanate having an NCO content of 30.5 and a viscosity of 102 cps at 25° C.

[2]The castor oil derivative was prepared by reacting by reacting 26 weight percent of palmitoyl chloride with castor oil.

MMDI-B=modified MDI prepared by reacting 4 weight percent propyleneglycol mono ricinoleate with MDI where MMDI-B has an NCO content of 31.1 weight percent and a viscosity of 155 cps at 25° C.
MMDI-C=modified MDI prepared by reacting 4 weight percent 12-hydroxy stearyl alcohol with MDI where MMDI-C has an NCO content of 30.7 weight percent a viscosity of 205 cps at 25° C.
MMDI-D[3] modified MDI prepared by reacting 0.4 weight percent with glycerin with MDI where MMDI-D has an NCO content of 32 weight percent a viscosity of 106 cps at 25° C.

[3] MMDI-D for 0.4 weight percent glycerin modified MDI. A 4.0 weight percent modification, as was used in the other examples was prepared, but the viscosity was 77,700 cps rendering it insoluble in the Part II formulation.

RESIN=a polybenzylic ether phenolic resin prepared with zinc acetate dihydrate as the catalyst and modified with the addition of 0.09 mole of methanol per mole of phenol prepared along the lines described in the examples of U.S. Pat. No. 3,485,797.

PREPARATION OF MODIFIED POLYISOCYANATES

The typical method for preparing the modified polyisocyanates used in the examples is as follows:

A modifier, i.e. castor oil, is added dropwise to a three neck round bottom flask containing MDI at room temperature with stirring. The flask is maintained under a nitrogen blanket and equipped with a condenser, mechanical stirrer and dropping funnel. The reaction was heated to 110° C. and maintained at this temperature for about 90 minutes to result in a modified polyisocyanate.

EXAMPLES

The examples will illustrate specific embodiments of the invention. These examples along with the written description will enable one skilled in the art to practice the invention. It is contemplated that many other embodiments of the invention will be operable besides these specifically disclosed. All parts are by weight and all temperatures are in ° C. unless otherwise specified.

The first example is a CONTROL which will show the effects of using an unmodified MDI in the foundry binder. The Example A using the BLEND is a comparative example which shows the effects of blending castor oil into the phenolic resin component of the binder. Examples 1 and 2 show the effect of reacting different amounts of castor oil to modify the MDI. Example 3 illustrates the effect of using a derivative of castor oil, i.e. a partially acrylated castor oil, to modify the MDI. Examples B, C, and D are comparison examples and where the modified polyisocyanates are prepared with propyleneglycol mono ricinoleate, and 12-hydroxy stearyl alcohol, and glycerin respectively.

The modified polyisocyanates were used in foundry binders to make foundry cores by the cold-box process. The formulations of the foundry binders are given in the Table I.

TABLE II

BINDER FORMULTION

| PART 1 PHENOLIC RESIN COMPONENT (pbw) | | PART II MODIFIED POLYISOCYANATE COMPONENT (pbw)[4] | |
| --- | --- | --- | --- |
| RESIN | 55.0 | MMDI | 77.3 |
| ESTER SOLVENT | 24.0 | ARS | 17.8 |
| ARS | 20.0 | ALS | 2.3 |
| FATTY ACID | 0.8 | DRYING OIL | 1.8 |
| SILANE | 0.2 | BLE | 0.3 |

[4]The unmodified polyisocyanate component was the same except the amount of unmodified polyisocyanate in the polyisocyanate component is 77.3 pbw, the amount of AHS is 17.8 pbw, and the BLE is 0.3 pbw.

Stability tests were conducted on the Part II component of the foundry binder used in Examples 1–3. These components were phase stable at –20° C., 25° C., and 60° C. for at least one month, and the solutions remained clear.

One hundred parts of binder (Part I first and then Part II) were mixed with Manley 1L5W Lake sand such that the weight ratio of Part I to Part II was 55/45 and the binder level was 1.5 weight percent. The resulting foundry mix is forced into a dogbone-shaped test corebox by blowing it into the corebox. The shaped mix in the corebox is then contacted with TEA at 20 psi for 2 seconds, followed by a 10 second nitrogen purge at 40 psi., thereby forming AFS tensile strength samples (dog bones) using the standard procedure.

The laboratory temperature was 22° C. and the relative humidity (RH) was 35%. The temperature of the constant temperature room (CT) was 25° C. and the relative humidity was 50%.

The tensile strengths of the cores made according to the examples were measured on a Thwing Albert Intellect II instrument. Tensile strengths were measured on "fresh sand" 30 seconds, 5 minutes, 1 hour, and 24 hours after curing. In order to check the resistance of the cores to degradation by humidity, the cores were also stored in a humidity chamber for 24 hours at a humidity of 90 percent relative humidity. The results are set forth in Table III.

Measuring the tensile strength of the dog bone samples enables one to predict how the mixture of sand and polyurethane-forming binder will work in actual foundry operations. Lower tensile strengths for the samples indicate that the phenolic resin and polyisocyanate reacted more extensively prior to curing and/or that the cores degraded due to humidity.

TABLE III

TENSILE STRENGTHS (PSI) OF TEST CORES PREPARED WITH MODIFIED AND UNMODIFIED POLYISOCYANATE

| | | TENSILE STRENGTHS (psi) | | | | |
|---|---|---|---|---|---|---|
| Example | MMPI | 30 sec | 5 min | 1 hr | 24 hr | 24 hr @ 90% RH |
| CONTROL | UNMODIFIED | 146 | 226 | 255 | 269 | 152 |
| A | BLEND | 104 | 184 | 193 | 235 | 142 |
| 1 | MMPI-1 | 138 | 208 | 243 | 253 | 146 |
| 2 | MMPI-2 | 149 | 235 | 254 | 267 | 151 |
| 3 | MMPI-3 | 150 | 226 | 266 | 278 | 180 |
| B | MMPI-B | 123 | 187 | 247 | 231 | 116 |
| C | MMPI-C | 107 | 155 | 163 | 225 | 98 |
| D | MMPI-D | 115 | 177 | 185 | 231 | 98 |

The data indicate that, when used in binders for making foundry test cores, the binders with the modified polyisocyanates provide test cores with initial tensile strengths comparable to the binders containing the unmodified polyisocyanates.

Curing efficiency of the binder was measured by conducting bulk cure tests. Bulk cure is the method used for determining the curing efficiency of a binder with a given catalyst, or for comparing the curing efficiency of related catalysts relative to a given binder. In order measure bulk cure, a foundry mix is prepared with a binder and sand. The mix is loaded into a chamber, gassed with the catalyst, and the curing efficiency is calculated on the basis of the amount of the catalyst consumed for the particular binder.

The specific test used a cold-box binder containing the CONTROL, MMPI-1, and MMPI-2 with triethylamine (TEA) as the catalyst. The bulk cure tests were performed at about 66° C. with a known amount of TEA (100 microliters of triethylamine), a known amount of binder level (1.5 wt %), and 1200 grams of sand with a Part I to Part II binder weight ratio of 55:45.

The results are set forth in Table V. These tests indicate that the binders containing the MMPI-1 and MMPI-2 cure more efficiently than the binder containing the CONTROL. The result is that less binder can be used to obtain the properties needed in the cores and molds produced. This results in cost savings and less stress on the environment.

TABLE IV

COMPARISON OF BULK CURE RESULTS FOR BINDERS MADE WITH MODIFIED AND UNMODIFIED POLYISOCYANATE

| Example | MMPI | BULK CURE RATE |
|---|---|---|
| CONTROL | UNMODIFIED | 42.3% |
| A | BLEND | NM[5] |
| 1 | MMPI-1 | 57.6% |
| 2 | MMPI-2 | 54.3% |
| 3 | MMPI-3 | NM |

TABLE IV-continued

COMPARISON OF BULK CURE RESULTS FOR BINDERS MADE WITH MODIFIED AND UNMODIFIED POLYISOCYANATE

| Example | MMPI | BULK CURE RATE |
|---|---|---|
| B | MMPI-B | NM |
| C | MMPI-C | NM |
| D | MMPI-D | NM |

[5] NM=not measured.

A pad sticking test was conducted which reflects the ability of cores prepared with a binder to release a core box. The procedure involves repeatedly blowing a mixture of Manley 1L5W Lake sand binder at 40 psi through a 1"×3.5"×6.5" draft into a 3"×6" inch core box. In the core box, the mix strikes two 1.5 inch diameter removable, polished stainless steel pads. The steel pads, which were weighed before test began, are ejected and weighed again at intervals of 1, 4, 7, and 10 cycles to measure sand accumulation. Any increase in weight indicates that the mix is sticking to the steel pads. The results of the tests are shown in Table V and in FIG. 1 which is a graphical representation of the data in Table V.

TABLE V

COMPARISON OF PAD STICKING RESULTS FOR BINDERS MADE WITH MODIFIED AND UNMODIFIED POLYISOCYANATE

| | | CYCLES | | | |
|---|---|---|---|---|---|
| Example | MMPI | 1 | 4 | 7 | 10 |
| CONTROL | UNMODIFIED | 0.1882 | 0.2116 | 0.2251 | 0.2147 |
| A | BLEND | 0.1797 | 0.2274 | 0.2596 | 0.2792 |
| 1 | MMPI-1 | 0.0129 | 0.0604 | 0.0676 | 0.0688 |
| 2 | MMPI-2 | 0.0102 | 0.0144 | 0.0310 | 0.0380 |
| 3 | MMPI-3 | 0.0764 | 0.0872 | 0.0840 | 0.0852 |
| B | MMPI-B | 0.1417 | 0.2515 | 0.3105 | 0.3324 |
| C | MMPI-C | 0.1526 | 0.1836 | 0.2026 | 0.2068 |
| D | MMPI-D | 0.1405 | 0.3296 | 0.4012 | 0.4210 |

The pad sticking tests show that less mix accumulated on the steel pads when the binder containing the castor oil modified MDI (Examples 1–3) was used. Based on experience with this test, one can predict that the binders using the modified MDI will provide better core and mold release from the pattern than the other binders tested.

We claim:

1. A polyurethane-forming foundry binder system curable with a catalytically effective amount of an amine curing catalyst comprising as separate components:

(A) a phenolic resin component; and (B) a polyisocyanate component comprising a polyisocyanate modified with a triglyceride of ricinoleic acid, wherein the ratio of OH groups of the triglyceride of ricinoleic acid to the NCO groups of the polyisocyanate is from about 0.1:100 to about 7.3:100.

2. The binder system of claim 1 wherein the phenolic resin component comprises a (a) a polybenzylic ether phenolic resin prepared by reacting an aldehyde with a phenol such that the molar ratio of aldehyde to phenol is from 1.1:1 to 3:1 in the presence of a divalent metal catalyst, and (b) a solvent in which the resole resin is soluble.

3. The binder system of claim 2 wherein the phenol is selected from the group consisting of phenol, o-cresol, p-cresol, and mixtures thereof.

4. The binder system of claim 3 wherein the aldehyde is formaldehyde.

5. The binder system of claim 4 wherein the NCO content of the polyisocyanate component is from 12% to 33%.

6. The binder system of claim 5 wherein the source of the triglyceride of ricinoleic acid is castor oil.

7. The binder system of claim 6 wherein the ratio of hydroxyl groups of the polybenzylic ether phenolic resin to the isocyanate groups of the polyisocyanate hardener is from 0.80:1.2 to 1.2:0.80.

8. The binder system of claim 7 wherein the divalent metal catalyst used to prepare the phenolic resin is zinc.

9. The binder system of claim 8 wherein the NCO content of the modified polyisocyanate is from 12 percent to 33 percent.

10. The binder system of claim 9 wherein the ratio of hydroxyl groups of the triglyceride of ricinoleic acid used to modify the polyisocyanate to isocyanato groups of the polyisocyanate is from 1:100 to 30:100.

11. A foundry mix comprising:
   (A) a major amount of aggregate; and
   (B) an effective bonding amount of the binder system of claim 1, 2, 3, 4, 5, 6, 7, 8, 9, or 10.

12. The foundry mix of claim 11 wherein the binder composition is about 0.6 to 5.0 weight percent based upon the weight of the aggregate.

13. A process for preparing a foundry shape by the cold-box process which comprises:
   (a) forming a foundry mix comprising a major amount of aggregate and minor amount of a foundry binder comprising:
      (1) a phenolic resin component; and
      (2) a polyisocyanate component comprising a polyisocyanate modified with a triglyceride of ricinoleic acid,
         wherein the ratio of OH groups of the triglyceride of ricinoleic acid to the NCO groups of the polyisocyanate in said binder from about 0.1:100 to about 7.3:100;
   (b) forming a foundry shape by introducing the foundry mix obtained from step (a) into a pattern;
   (c) contacting the shaped foundry mix with a tertiary amine catalyst; and
   (d) removing the foundry shape of step (c) from the pattern.

14. The process of claim 13 wherein the tertiary amine catalyst is a gaseous tertiary amine catalyst.

15. The process of claim 14 wherein the amount of said binder composition is about 0.6 percent to about 5.0 percent based upon the weight of the aggregate.

16. The process of claim 15 wherein the tertiary amine catalyst is a liquid tertiary amine catalyst.

17. The process of casting a metal which comprises:
   (a) preparing a foundry shape in accordance with claim 13;
   (b) pouring said metal while in the liquid state into and around said shape;
   (c) allowing said metal to cool and solidify; and
   (d) then separating the molded article.

* * * * *